(12) United States Patent
Sui (10) Patent No.: US 9,518,671 B2
(45) Date of Patent: Dec. 13, 2016

(54) VALVE DEVICE FOR FUEL TANK

(71) Applicant: NIFCO INC., Yokohama-shi, Kanagawa (JP)

(72) Inventor: Xiaohui Sui, Tama (JP)

(73) Assignee: NIFCO INC., Yokohama-Shi, Kanagawa (JP)

(*) Notice: Subject to any disclaimer, the term of this patent is extended or adjusted under 35 U.S.C. 154(b) by 45 days.

(21) Appl. No.: 14/374,718

(22) PCT Filed: Mar. 18, 2013

(86) PCT No.: PCT/JP2013/057730
§ 371 (c)(1),
(2) Date: Jul. 25, 2014

(87) PCT Pub. No.: WO2013/141220
PCT Pub. Date: Sep. 26, 2013

(65) Prior Publication Data
US 2015/0034174 A1   Feb. 5, 2015

(30) Foreign Application Priority Data

Mar. 22, 2012 (JP) .................. 2012-065643

(51) Int. Cl.
*F16K 24/04* (2006.01)
*F16K 27/02* (2006.01)
(Continued)

(52) U.S. Cl.
CPC .......... *F16K 24/042* (2013.01); *F16K 24/044* (2013.01); *F16K 27/02* (2013.01);
(Continued)

(58) Field of Classification Search
CPC ...... F16K 24/042; F16K 24/044; F16K 27/02; B60K 15/03519; F02M 25/0836; F02M 37/20; Y10T 137/3099; Y10T 137/0874
(Continued)

(56) References Cited

U.S. PATENT DOCUMENTS 2,957,546 A * 10/1960 Saunders ................ B61F 15/22
                                                    137/43
4,346,731 A    8/1982 Sigworth, Jr.
(Continued)

FOREIGN PATENT DOCUMENTS

CN       1683776 A    10/2005
CN     201866351 U     6/2011
(Continued)

OTHER PUBLICATIONS

PCT/ISA/210, "International Search Report for PCT/JP2013/057730".
(Continued)

*Primary Examiner* — William McCalister
*Assistant Examiner* — Ian Paquette
(74) *Attorney, Agent, or Firm* — Manabu Kanesaka (57) ABSTRACT

A valve device is attached to a fuel tank. The valve device includes a case including a vent valve port communicating outside of the tank at an upper portion, and including an inflow portion for a fuel below the vent valve port; and an upper floor body inside the case and rising by the fuel flowing into the case to be seated in the vent valve port. In a face portion facing a bottom portion of the upper float body in the case, an elastic piece is formed by a first arc-shaped split groove such that a center side of the face portion becomes a curvature inner side, and a second arc-shaped split groove formed such that a center of the face portion becomes a curvature inner side outside the first arc-shaped
(Continued)

split groove. One portion of the elastic piece abuts against the bottom portion of the upper float body.

9 Claims, 10 Drawing Sheets

(51) Int. Cl.
  *B60K 15/035* (2006.01)
  *F02M 25/08* (2006.01)
  *F02M 37/20* (2006.01)

(52) U.S. Cl.
  CPC .... *B60K 15/03519* (2013.01); *F02M 25/0836* (2013.01); *F02M 37/20* (2013.01); *Y10T 137/0874* (2015.04); *Y10T 137/3099* (2015.04)

(58) Field of Classification Search
  USPC .................................................. 137/43, 202
  See application file for complete search history.

(56) References Cited

U.S. PATENT DOCUMENTS

| | | | |
|---|---|---|---|
| 5,348,177 A | 9/1994 | Sung | |
| 6,688,330 B1* | 2/2004 | Ehrman | B60K 15/03519 137/202 |
| 7,243,639 B2 | 7/2007 | Ueki | |
| 7,886,759 B2* | 2/2011 | Miyoshi | B60K 15/03519 137/202 |
| 8,371,326 B2 | 2/2013 | Mills | |
| 2002/0046770 A1* | 4/2002 | Hattori | B60K 15/03519 137/202 |
| 2002/0062861 A1* | 5/2002 | Devall | B60K 15/03504 137/202 |
| 2007/0284001 A1 | 12/2007 | Yamada | |
| 2010/0224265 A1* | 9/2010 | Kobayashi | B60K 15/03519 137/202 |
| 2013/0133758 A1* | 5/2013 | Ko | F16K 24/044 137/202 |

FOREIGN PATENT DOCUMENTS

| | | |
|---|---|---|
| JP | 3323289 B | 9/2002 |
| JP | 2003-505654 A | 2/2003 |
| JP | 2008-247159 A | 10/2008 |

OTHER PUBLICATIONS

Europe Patent Office, "Search Report for EP 13765268.1," Oct. 19, 2015.

China Patent Office, "Office Action for CN 201380005606.8," Dec. 9, 2015.

* cited by examiner

VALVE DEVICE FOR FUEL TANK

RELATED APPLICATIONS

The present application is National Phase of International Application No. PCT/JP2013/057730 filed Mar. 18, 2013, and claims priority from Japanese Application No. 2012-065643, filed Mar. 22, 2012.

FIELD OF TECHNOLOGY

The present invention relates to an improvement of a valve device attached to a fuel tank of an automobile, a two-wheel automobile, and the like, and functioning in such a way as to communicate inside and outside of a tank in a valve-open state.

BACKGROUND ART

In a valve connecting the fuel tank and a vent passage, there is a valve forming a support portion of a cantilever float valve body by a sift formed in a bottom portion of a housing forming the valve, and absorbing impact energy when the float valve body descends by bending of the support portion (see Patent Documents 1 and 2).

In this kind of valve, it is required to reduce a site as small as possible from various demands. Therefore, there is also a limit in forming the support portion in the bottom portion of the housing. However, in the valve of the Patent Document 1, the slit is formed in a radial direction from a center of the bottom portion of the housing (see FIG. 2 of the Patent Document 1), and reduction of a diameter of the valve immediately results in a shortening of a whole length of such support portion. As the whole length of such support portion becomes shorter, bending of the support portion becomes harder, so that in order to effectively absorb the aforementioned impact energy, it is necessary to ensure that the whole length of such support portion be as large as possible even if the valve is reduced in size. On the other hand, in the Patent Document 2, the slit is formed in parallel with a tangent of a circle of the housing having a circular shape in a cross section (see FIG. 2A in of the Patent Document 2), and the reduction of the diameter of the valve does not immediately result in the shortening of the whole length of such support portion; however, the whole length of the support portion cannot be ensured at a maximum.

PRIOR ART DOCUMENT

Patent Document

Patent Document 1: Japanese Patent No. 3323289
Patent Document 2: Japanese Patent Application Publication No. 2003-505654

SUMMARY OF THE INVENTION

Problem to be Solved by the Invention

A main object of the present invention is that in thus kind of valve, without complicating a structure of such valve, a whole length of an elastic piece, which abuts against a bottom portion of a float body and elastically deforms when the float body descends so as to absorb impact energy of the descending, can be ensured as large-sized as possible.

Means for Solving the Problems

In order to attain the aforementioned object, in the present invention, a valve device for a fuel tank is attached to a fuel tank to be used, and comprises a case including a vent valve port communicated with an outside of the tank at an upper portion, and including an inflow portion for a fuel below the vent valve port; and a float body which is located inside the case and rises by the fuel flowing into the case so as to be seated in the aforementioned vent valve port. Also, in a face portion facing a bottom portion of the float body in the case, there is formed an elastic piece by a first arc-shaped split groove formed in such a way that a center side of the face portion becomes a curvature inner side, and a second arc-shaped split groove formed outside the first arc-shaped split groove in such a way that a center of the face portion becomes the curvature inner side. One portion of the elastic piece abuts against the bottom portion of the float body.

The elastic piece is formed by the first arc-shaped split groove and the second arc-shaped split groove formed in the aforementioned manner, so that such elastic piece is also curved in such a way that the center side of the aforementioned face portion becomes the curvature inner side, and even in a case wherein a space cannot be widely secured for forming such elastic piece in the face portion of the case, such elastic piece cam be structured as long as possible. Thereby, by increasing a bending amount of the elastic piece as much as possible when one portion of such elastic piece abuts against the upper float body, such elastic piece can sufficiently absorb impact energy of the abutment.

As for one of preferred embodiments of the present invention, in the face portion facing the bottom portion of the float body in the case, there is formed the elastic piece by the first arc-shaped split groove formed in such a way that the center of the face portion becomes the curvature inner side; the second arc-shaped split groove formed outside the first arc-shaped split groove in such a way that the center of the face portion becomes the curvature inner side; and a communication portion communicating between groove ends of both the arc-shaped split grooves, and the communication portion side becomes a free end, and in the free end of the elastic piece, there is protruded an abutment portion relative to the bottom portion of the float body. Also, as for one of the preferred embodiments of the present invention, the case is formed in such a way as to have a cylindrical shape, and the elastic piece is formed along an arc of a virtual circle around a cylinder axis of the case. In this case, furthermore, if the communication portion is formed such that a width of the free end of the elastic piece is larger than that of the rest of the elastic piece, while forming the aforementioned rest of the elastic piece with a width which is easily elastically deformable, an area of a portion of the elastic piece abutting against the bottom portion of the upper float body, i.e., an area of a protruding end of the abutment portion, is increased as large as possible, so that the upper float body which is at a descent position can be stably supported by such elastic piece.

Also, in the face portion of the case, if there are provided two or more elastic pieces at an interval between adjacent elastic pieces in a direction around the center of the face portion, an impact when the float body descends is absorbed at a plurality of portions of the face portion of the case, area the descended float body can be stably supported by a plurality of elastic pieces.

Also, if by a third arc-shaped spins groove formed outside the second arc-shaped split groove in such a way that the center of the face portion of the case becomes the curvature inner side; and a communication portion communicating between one groove end of the second arc-shaped split groove and one groove end of the third arc-shaped split groove, a supplemental elastic piece in which the communication portion side is the free end is formed, and if there is protruded an abutment portion relative to the bottom portion of the float body at the free end of the supplemental elastic piece, the elastic piece and the supplemental elastic piece, abutting against the bottom portion of the float body when the float body descends, can be provided within a limited space. These are easily elastically deformable when the elastic piece and the supplemental elastic piece abut against the bottom portion of the float body.

Effect of the Invention

According to the present invention, without complicating a structure of such valve, a whole length of the elastic piece, which abuts against the bottom portion of the float body and elastically deforms when the float body descends so as to absorb impact energy of the descending, can be ensured as large-sized as possible.

BEST MODES OR CARRYING OUT THE INVENTION

Hereinafter, based on FIG. 1 to FIG. 13, typical embodiments of the present invention will be explained. A valve device for a fuel tank according to the present embodiment is attached to a fuel tank T of an automobile, a two-wheel automobile, and the like, and functions in such a way us to communicate inside and outside of a tank in a valve-open state.

Typically, such valve device is attached to an upper portion of the fuel tank T, and forms one portion of a connection passage (a vent passage E) relative to the fuel tank T. In an illustrated example, furthermore, such valve device blocks the aforementioned communication between the inside and outside of the tank using a rise in a fuel liquid level by supplying a fuel F into the fuel tank T so as to allow a pressure inside the tank to rise. Accordingly, the valve device allows the fuel liquid level inside a filler pipe to rise so as to function in such a way as to allow a sensor of a fueling gun to detect a full tank.

More specifically, first, when the fuel liquid level inside the fuel tank T reaches a predetermined first Liquid level fa, the valve device according to the embodiment raises the later-described lower float body 5 so as to i.e., throttle the aforementioned vent passage E. Accordingly, the pressure inside the fuel tank T rises so as to raise the fuel liquid level inside the filler pipe which is not shown in the drawings and to allow the sensor of the fueling gun to detect the first full tank. Next, secondly, after fueling stops by a detection of the first full tank, the pressure inside the fuel tank T declines by ventilation through the throttled vent passage E, and the fuel liquid level inside the filler pipe decreases so as to allow additional fueling. Then, thirdly, by the additional fueling, when the fuel liquid level inside the fuel tank T reaches a predetermined second liquid level fb which is higher than the first liquid level fa, the later-described upper float body 3 rises so as to close the vent passage E. Accordingly, the pressure inside she fuel tank T rises so that the fuel liquid level inside the filler pipe rises so as to allow the sensor of the fueling gun to detect a final full tank.

Such valve device comprises a case 1, the upper float body 3, and the lower float body 5.

The case 1 includes a vent valve port 10 communicated with the outside of the tank at an upper portion, and includes inflow portions 11 for a fuel below the vent valve port 10. Also, by a bulkhead 12 formed between the vent valve port 10 and the inflow portions 11, an upper chamber 13 and a lower chamber 14 are divided.

In the illustrated example, such case 1 is formed by an upper body 15 and a lower body 16. The upper body 15 is formed in such a way as to have a cylindrical shape. A cylinder upper end of the upper body 15 is closed by a top plate portion 15a including the circular vent valve port 10 at a center. On an upper face of the top plane portion 15a, a short cylindrical portion 15b allowing a cylinder inner space to be communicated with the vent valve port 10 and protruding upward from the top plate portion 15a is formed integrally with the top plate portion 15a. Outside the short cylindrical portion 15b, there is fitted a seal ring 15c. A cylinder lower end of the upper body 15 is open.

On the other hand, the lower body 16 is formed in such a way as so have a cylindrical shape whose both cylinder upper and lower ends sire open. Between the cylinder upper and lower ends of the lower body 16, there is formed a partition wall 160 dividing a space inside the lower body 16 up and down. At a center portion of the partition wall 160, there is formed a circular through hole 161a, and the through hole 161a becomes the later-described main communication portion 161. Also, at both side positions sandwiching the through hole 161a, there are formed through holes 162a which are smaller than the through hole 161a and which become the later-described auxiliary communication portions 162.

Also, just above the through hole 121a of the partition wall 160, there is disposed a discoid body 163 having an outer diameter approximately equal to a hole diameter of the through hole 161a in such a way as to overlap an outer edge thereof with a hole edge of the through hole 161a in a plan view, and to open a gap between a lower face of the discoid body 163 and an upper face of the partition wall 160 in an up-and-down direction. In the illustrated example, there are provided four bridge pieces 164 ranging between the discoid body 163 and the partition wall 160 at intervals in a direction around the center of the discoid body 163, and as mentioned above, the discoid body 163 is supported on the partition wall 160 by the four bridge pieces 164. In the illustrated example, the aforementioned bulkhead 12 is formed by such partition wall 160 and discoid body 163.

Also, at a center of the discoid body 163, there is formed the later-described insertion portion 165. The insertion portion 165 is formed by an insertion hole 165a provided at the center of the discord body 163 in a penetration state; and a cylindrical support portion 165b protruding upward from an upper face of the discoid body 163 in such a way as to communicate a cylinder lower end with the insertion hole 165a.

Also, on the upper face of the discoid body 163, there is formed a plurality of projections 166, 166, with an arc, between adjacent projections 166, of a virtual circle surrounding the cylindrical support portion 165b at approximately equal intervals, and a spring lower end of the later-described compression coil spring 4 is combined with the discoid body 163 in such a way as to house a row of the projections 166, 166 . . . inside the spring lower end.

Also, at positions which are located on a cylinder lower end side of the lower body 16 and directly under the auxiliary communication portions 162, concave portions 167 are formed in such a way as to dent lateral portions of the lower body 16 inward. Such concave portions 167 are formed on the right and left of the lower body, and the later-described lower float body 5 moves up and down between the right-and-left concave portions 167. Also, the concave portions 167 are open at the cylinder lower end of thus lower body 16, and upper portions thereof are closed by portions forming the auxiliary communication portions 162 in the bulkhead 12.

In the illustrated example, the case 1 is formed such that the upper body 15 is fitted inside a portion above the partition wall 160 in such lower body 16 from the cylinder lower end side. The case 1 formed in the above-mentioned manner allows the cylinder lower end or the lower body 16 and the concave portion 167 to function as the aforementioned inflow portions 11.

Also, in the illustrated example, such case 1 is combined with a flange 2, and is attached to the fuel tank T by the flange 2. The flange 2 includes a head portion 20 and a cylindrical connection portion 21 protruding downward from the head portion 20. In the head portion 20, there is integrally provided a connection pipe portion 22 protruding laterally, and the connection pipe portion 22 is communicated with a space inside the cylindrical connection portion 21 at a center of the head portion 20. The communication portion is surrounded by a circumference rising portion 23 inside the flange 2. In the illustrated example, an upper portion of the upper body 15 is fitted into the cylindrical connection portion 21 of the flange 2 in such a way as to insert the short cylindrical portion 15b of the upper body 15 into the circumference rising portion 23 of the flange 2 so as to integrate the flange 2 and the case 1. The aforementioned seal ring 15c seals between the short cylindrical portion 15b of the upper body 15 and the circumference rising portion 23 of the flange 2 in an airtight state. Thereby, the inside and outside of the tank is communicated through the inflow portions 11 and the vent valve port 10 of the case 1, and the connection pipe portion 22. The case 1 is inserted into an attachment hole Ta having a site preventing the head portion 20 of such flange 2 from entering and provided to open in the final tank T from the outside so as to be disposed inside the tank, and the head portion 20 of the flange 2 is fixed by being welded and the like to an outer face portion of the fuel tank T, so that the case 1 is provided to the fuel tank T.

The upper float body 3 is located inside the upper chamber 13 of the case 1 and rises by a fuel flowing into the case 1 so as to be seated in the aforementioned vent valve port 10. In a state wherein the fuel does not flow into the upper chamber 13, the upper float body 3 is at a descent position supported by the bulkhead 12 of the lower body 16, and the vent valve port 10 is open. Namely, in the embodiment, such bulkhead 12 functions as a face portion facing a bottom portion of the upper float body 3 in the case 1.

In the illustrated example, such upper float body 3 includes a float main body 30 having a ceiling portion and lateral portions forming a cylinder shape; a seal member 31 for the vent valve port 10 formed by a material having elasticity; and a support member 32 for the seal member 31. The support member 32 is formed in such a way as to have approximately a disc shape including an engagement claw 32a protruding downward at an outer periphery portion, and a through hole 32b at a center portion. At an outer periphery portion of the ceiling portion of the float main body 30, there is formed an engaged portion 30a in which the engagement claw 32a of such support member 32 is caught, and in a state wherein the engagement claw 32a is engaged with the engaged portion 30a, the support member 32 is disposed on the ceiling portion of the float main body 30. The seal member 31 has a disc shape having an outer diameter blocking the vent valve port 10, and includes a fitting projection 31a relative to the through hole 32b of the support member 32 at a center of a fewer portion. With the fitting projection 31a, the seal member 31 is assembled in the support member 32 so as to be positioned directly under the vent valve port 10.

In such upper float body 3, there is provided a housing hole 33 in which the later-described guide avis 50 of the lower float body 5 can be housed. The housing hole 33 is formed inside a concave portion 30b formed at a center of a lower portion of the float main body 30 of the upper float body 3. The concave portion 30b has a circular hole shape. Inside the concave portion 30b, there is formed a boss-like portion 30c protruding downward from an upper bottom of the concave portion 30b. A lower end of the boss-like portion 30c is positioned above a cylinder lower end of the upper float body 3, and the aforementioned cylindrical support portion 165b and the row of the projections 166, 166 . . . can be housed inside the concave portion 30b under the lower end of the boss-like portion 30c when the upper float body 3 descends. (FIG. 2) Also, the compression coil spring 4 is incorporated inside the concave portion 30b in a compression state in such a way as to house the boss-like portion 30c inward. A spring lower end of the spring 4 contacts with the partition wall 160 of the lower body 16, and a spring upper end contacts with the upper bottom of the concave portion 30b, and by the spring 4, a constant upward force acts on the upper float body 3.

The lower float body 5 includes the guide axis 30 protruding upward, and the guide axis 30 is inserted into the insertion portion 165 formed in the aforementioned bulkhead 12 movably upward and downward from a lower chamber 14 side of the case 1, so that the lower float body 5 is supported inside the lower chamber 14. Also, the lower float body 5 rises by the fuel flowing into the case 1 so as to close the main communication portion 161 between the lower chamber 14 and the upper chamber 13 formed in the bulkhead 12.

In the illustrated example, such lower float body 5 includes a float main body 51 housed below the bulkhead 12 of the lower body 16 movably upward and downward; and the guide axis 50. The float main body 51 has a short cylinder shape, and is housed inside the lower body 16 along a cylinder axis thereof in an up-and-down direction. A cylinder upper end of the float main body 51 is closed, and a cylinder lower end of the float retain body 51 is open. An outer diameter of the lower float body 5 is larger than that of the main communication portion 161 provided in the partition wall 160 forming the bulkhead 12.

Figure 1:
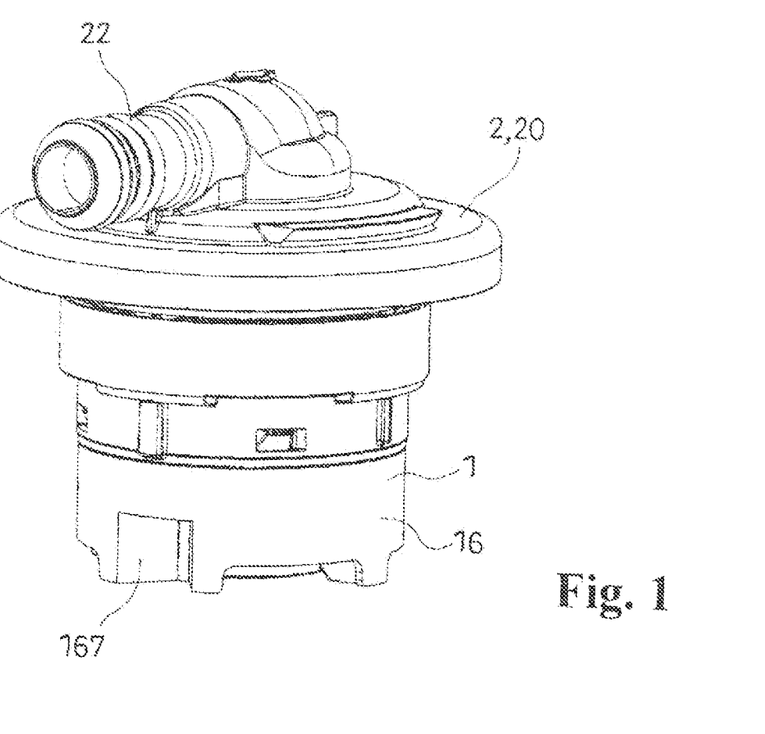
FIG. 1 is a perspective view of a valve device according to an embodiment of the present invention.
Figure 2:
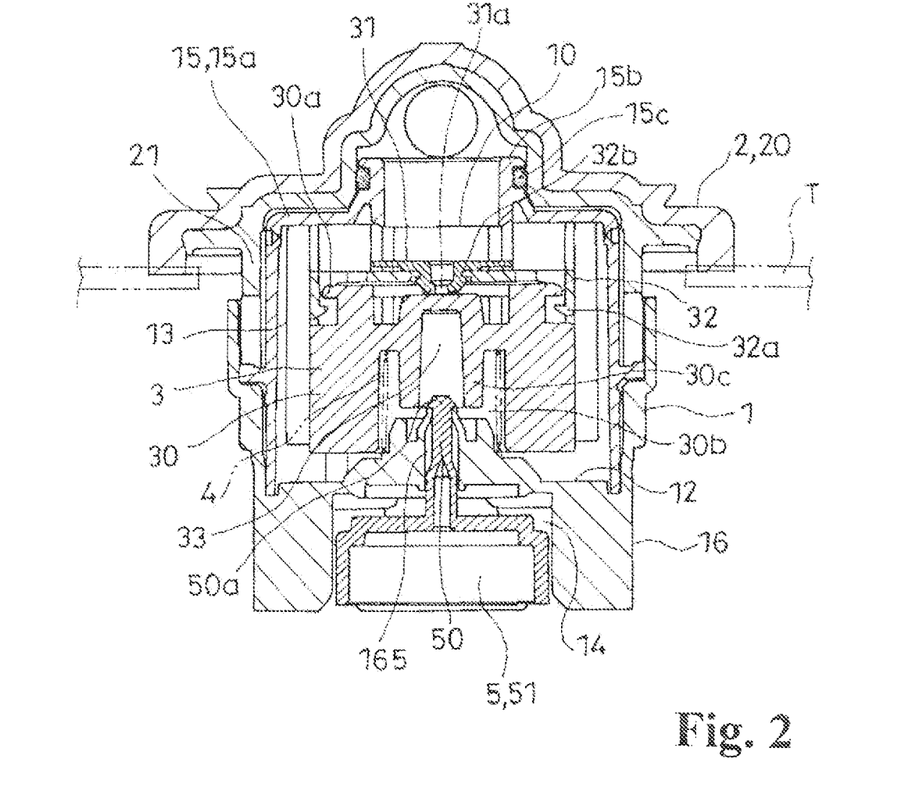
FIG. 2 is a cross-sectional view of the valve device.
Figure 3:
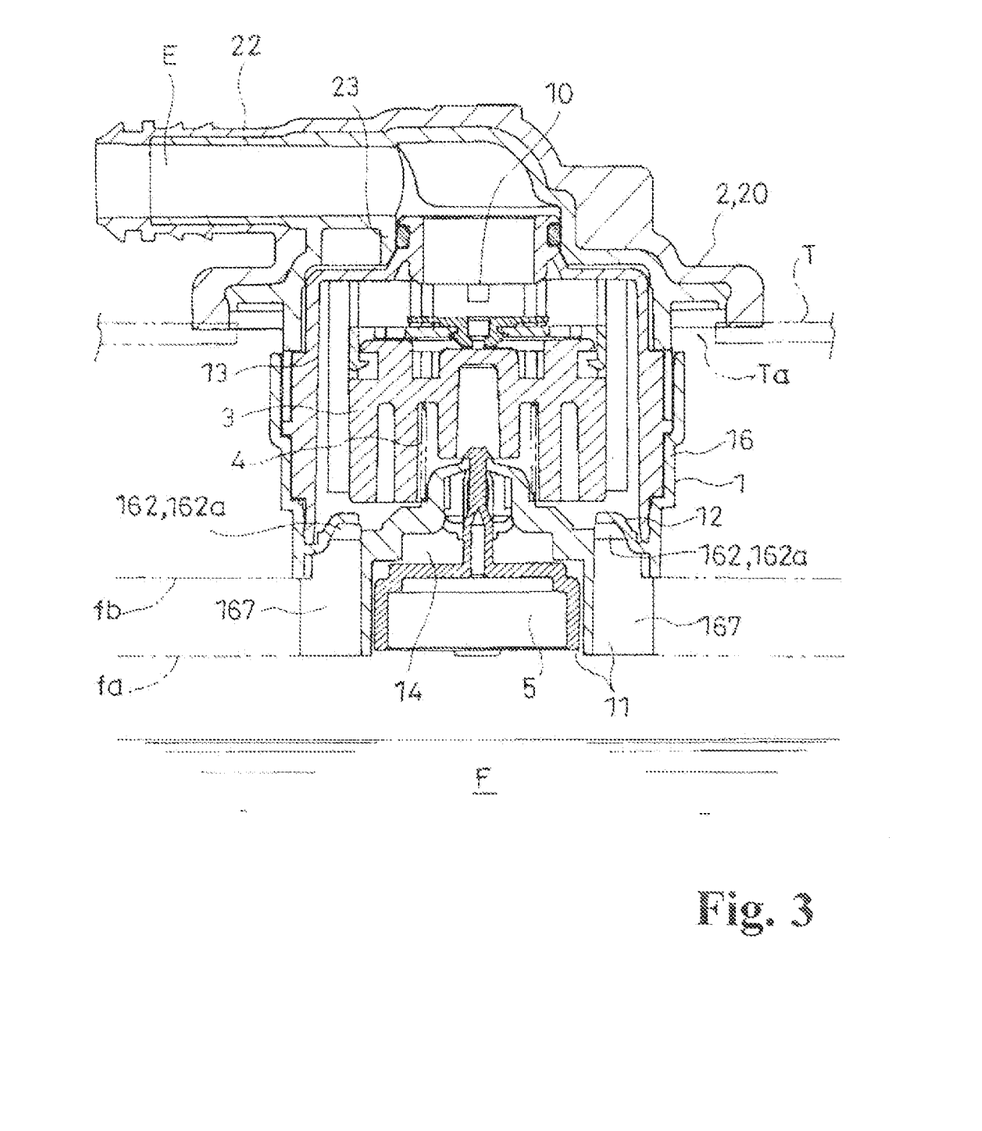
FIG. 3 is a cross-sectional view of the valve device, and shows the valve device at a position different by 90 degrees from FIG. 2 in a cross section.
Figure 4:
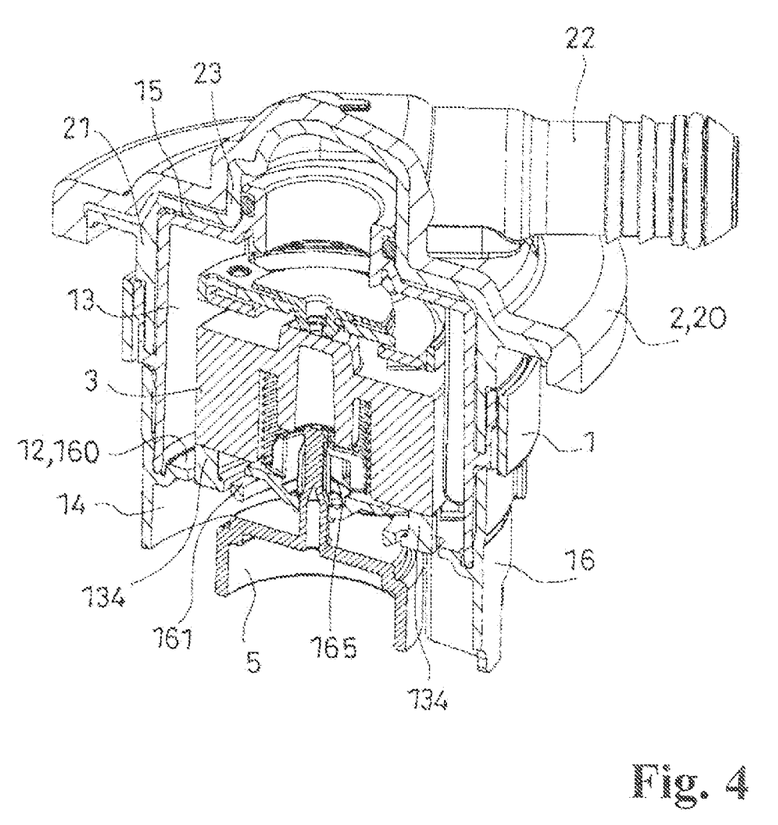
FIG. 4 is a cross-sectional perspective view of essential parts of the valve device.
Figure 5:
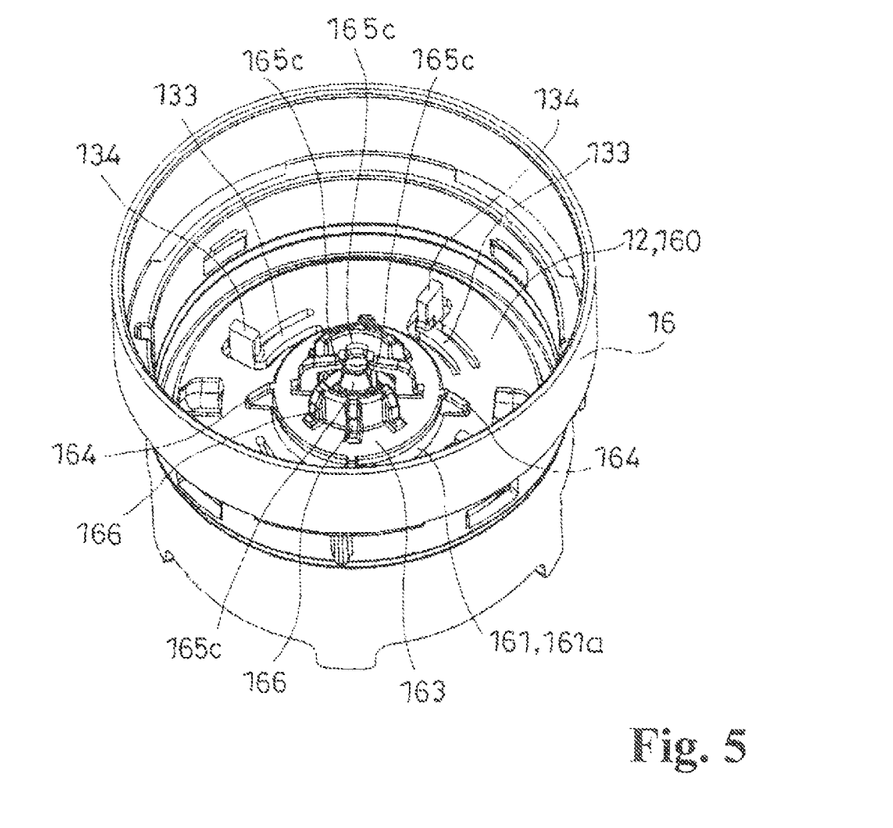
FIG. 5 is a perspective view of a lower body forming a case of the valve device.
Figure 6:
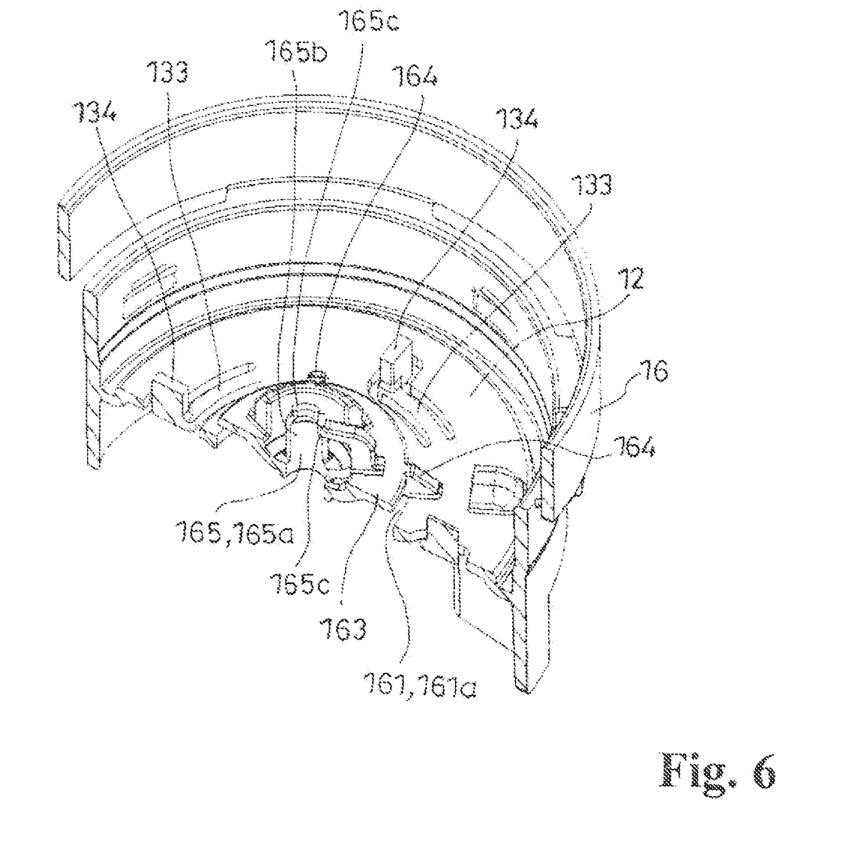
FIG. 6 is a partially broken perspective view showing the lower body in FIG. 5.
Figure 7:
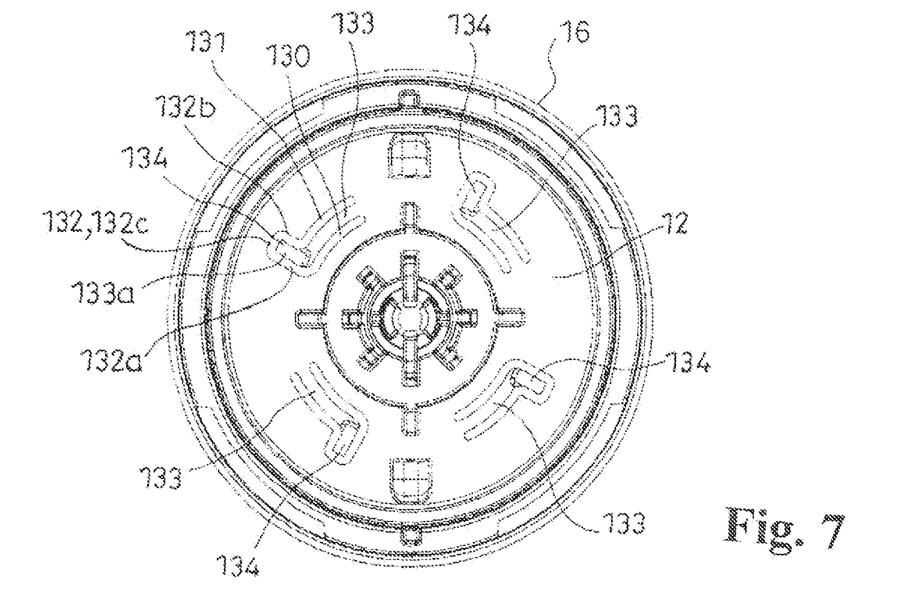
FIG. 7 is a plan view of the lower body in FIG. 5.

The guide axis 50 includes a head portion 50a on an upper end. Also, an outer diameter of an intermediate portion between the head portion 50a and a base portion is approximately equal to an inner diameter of a cylinder upper end of the cylindrical support portion 165b forming the insertion portion 165. Also, an outer diameter of the base portion is approximately equal to that of the head portion 50a, is larger than that of the intermediate portion, and is approximately equal to a hole diameter of the insertion hole 165a forming the insertion portion 165. Then, in the embodiment, the lower float body 5 is supported in the bulkhead 12 in a suspended manner in a state wherein the head portion 50a of the guide axis 50 passing through the cylindrical support portion 165b through the insertion hole 165a is caught in the cylinder upper end of the cylindrical support portion 165b. In the aforementioned caught state, the lower float body 5 is at the most descended position the bulkhead 12 and the closed cylinder upper end of the float main body 51 are separated, and the main communication portion 161 is open. (FIG. 4).

Until the fuel liquid level reaches the inflow portion 11 of the case 1, ventilation inside and outside the tank is secured through the inflow portion 11, the main communication portion 161, the auxiliary communication portion 162, and the vent valve port 10. The ventilation through the main communication portion 161 is carried out between lateral faces of the float main body 51 of the lower float body 5 and an inner face of the lower body 16; the ventilation through the auxiliary communication portion 162 is carried out through the concave portion 167; and the ventilation through the vent valve port 10 is carried out between the lateral portions of the float main body 30 of the tipper float body 3 and an internal face of the upper chamber 13. When the fuel liquid level reaches the cylinder lower end of the lower body 16 forming the inflow portion 11 of the case 1 by fueling (the first liquid level fa), the fuel F enters into the lower chamber 14 by a pressure difference between the pressure inside the tank and a pressure inside the case 1 so as to raise the lower float body 5. Thereby, the main communication portion 161 is closed, and the fuel liquid level inside the filler pipe rises by a pressure rise inside the tank, so as to allow the sensor of the fueling gun to detect the first full tank. When the fueling stops by the detection of the first full tank, the lower float body 5 continues to close the main communication portion 161, so that an internal pressure inside tore tank declines due to the ventilation so as to allow the additional fueling. Specifically, mainly, the additional fueling can be carried out by the ventilation through she concave portion 167 and the auxiliary communication portion 162. When the fuel liquid level rises further by the additional fueling, the fuel enters into the upper chamber 13, and the upper float body 3 rises so as to be seated in the vent valve port 10. Thereby, the fuel liquid level inside the filler pipe rises again by the pressure rise inside the tank, so as to allow the sensor of the fueling gun to detect the final full tank. Specifically, when the fuel liquid level reaches an upper portion of the concave portion 167 (the second liquid level fb), the fuel enters into the upper chamber 13 through the auxiliary communication portion 162 by the pressure difference between the pressure inside the tank and the pressure inside the case 1. When the fuel liquid level declines, first, the fuel F flows out of the upper chamber 13, and the upper float body 3 descends so as to open the vent valve port 10. Next, when the fuel liquid level declines further, the lower float body 3 descends so as to open the main communication portion 161. Incidentally, in the embodiment, when the upper float body 3 does not rise, i.e., is at the descent position, and the lower float body 5 is risen, the guide axis 50 of the lower float body 5 can be housed in the housing hole 33 of the upper float body 3.

Also, in the embodiment, at an upper end of the insertion portion 165, there is formed an engagement portion allowing the head portion 50a of the guide axis 50 to pass through from below by an elastic deformation. In the illustrated example, the aforementioned cylindrical support portion 165b is formed by four elastic pieces 165c . . . 165c, and when the guide axis 50 passes through the insertion portion 165 from below through the insertion hole 165a, the four elastic pieces 165c . . . 165c bend outward once, and then at a position where the head portion 50a comes out of upper ends of the elastic pieces 165c, the elastic pieces 165c bend to return, so as to be engaged with the head portion 50a.

Also, in the embodiment, in the face portion facing the bottom portion of the upper float body 3 in the case 1, in the illustrated example, in the bulkhead 12, there is provided a structure for preventing the generation of collision sound by absorbing the impact energy of the abutment of the bottom portion of the upper float body 3 against the bulkhead 12 when such upper front body 3 descends.

In the embodiment, in the bulkhead 12 as the aforementioned face portion, at a center thereof, in the illustrated example, by a first arc-shaped split groove 130 formed in such a way that the aforementioned main communication portion 161 side becomes a curvature inner side, and a second arc-shaped split groove 131 formed in such a way that the center of the face portion becomes the curvature inner side outside the first arc-shaped spiff groove 130, there is formed an elastic piece 133 by one portion of the bulkhead 12. Then, when the upper float body 3 descends, one portion of the elastic piece 133 abuts against the bottom portion of the upper float body 3. A thickness in an up-and-down direction of such elastic piece 133 is equal to a thickness of the bulkhead 12. Typically, by forming the lower body 16 as a molded article made of synthetic resin, specific elastic deformation characteristics can be provided to such elastic piece 133.

Such elastic piece 133 is formed by the first arc-shaped split groove 130 and the second arc-shaped split groove 131 formed in the aforementioned manner, so that such elastic piece 133 is also curved in such a way that a center side of the aforementioned face portion becomes the curvature inner side, and even in a case wherein a space cannot be secured widely for forming such elastic piece 133 in the face portion of the case 1, specifically, even in a case wherein a space cannot be secured widely between the main communication portion 161 and lateral portions of the case 1, such elastic piece 133 can be structured as long as possible. Thereby, by increasing a bending amount of the elastic piece 133 as much as possible when one portion of such elastic piece 133 abuts against the upper float body 3, such elastic piece 133 can sufficiently absorb the impact energy of the abutment. Also, in the illustrated example, by such elastic piece 133, when the upper float body 3 descends, a traveling vibration of a vehicle is difficult ho transmit to the upper float body 3 so as to prevent the generation of abnormal sound or abrasion between the float main body 30 and the support member 32 of the seal member 31 forming such upper float body 3.

In the example shown in FIG. 1 to FIG. 7, such elastic piece 133 is structured by a curved piece formed by the first and second arc-shaped split grooves 130 and 131, and a communication portion 132 communicating between one groove end of the first and second arc-shaped split grooves 130 and 131. Also, in a free end 133*a* of the elastic piece 133, there is protruded an abutment portion 134 relative to the bottom portion of the upper float body 3, and the abutment portion 131 abuts against the bottom portion of the upper float body 3. In the example, the case 1 has a cylindrical shape, and the elastic piece 133 is formed in such a way as to follow an arc of a virtual circle around a cylinder axis of the case 1.

Also, in the example shown in FIG. 1 to FIG. 7, the communication portion 132 is formed such that a width of the free end 133*a* of the elastic piece 133 is larger than that of the rest of the elastic piece 133. Thereby, in the example, while forming the aforementioned rest of the elastic piece 133 with a width which is easily elastically deformable, an area of a portion of the elastic piece 133 abutting against the bottom portion of the upper float body 3, i.e., an area of a protruding end of the abutment portion 134, is increased as large as possible, so that the upper float body 3 at the descent position can be stably supported by such elastic piece 133. In the illustrated example, the communication portion 132 is formed by a first split groove 132*a* which is orthogonal to the first arc-shaped split groove 130 and extends outward from one groove end of the first arc-shaped split groove 130; a second split groove 132*b* which is orthogonal to the second arc-shaped split groove 131 and extends outward from one groove end of the second arc-shaped split groove 131; and a third split groove 132*c* communicating between a terminal of the first split groove 132*a* and a terminal of the second split groove 132*b*. Then, in a plan view, the elastic piece 133 is viewed such that a free end 133*a* side thereof is bent toward a lateral portion side of the case 1 by the communication portion 132.

Also, in the example shown in FIG. 1 to FIG. 7, in the face portion of the case 1, there are provided two or more elastic pieces 133, 133 . . . at an interval between adjacent elastic pieces 133 in a direction around a center of the face portion. Thereby, in the example, an impact when the upper float body 3 descends is absorbed at a plurality of portions of the face portion of the case 1, and the descended upper float body 3 is stably supported by a plurality of elastic pieces 133, 133 . . . . Such plurality of elastic pieces 133, 133 . . . is disposed such that in the direction around the center of the face portion, one base end of the adjacent elastic pieces 133 is positioned in front of the free end 133*a*, and the other free end 133*a* of the adjacent elastic pieces 133 is positioned at the back of the base end thereof.

Figure 8:
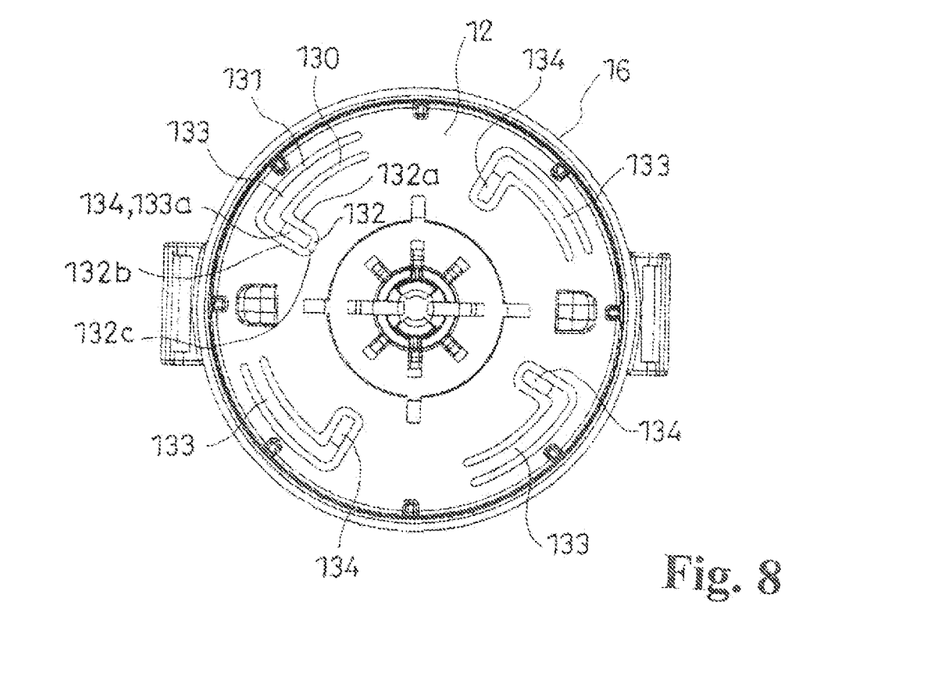
FIG. 8 is a plan view showing a first modified example in which one portion of a structure of the lower body is modified.

In an example shown in FIG. 8, the communication portion 132 is formed by the first split groove 132*a* which is orthogonal to the first arc-shaped spilt groove 130 and extends inward from one groove end of the first arc-shaped split groove 130; the second split groove 132*b* which is orthogonal to the second arc-shaped split groove 131 and extends inward from one groove end of the second arc-shaped split groove 131; and the third split groove 132*c* communicating between the terminal of the first split groove 132*a* and the terminal of the second split groove 132*b*. Then, in a plan view, the elastic piece 133 is viewed such that the free end 133*a* side thereof is bent toward a center side of the case 1 by the communication portion 132.

Figure 9:
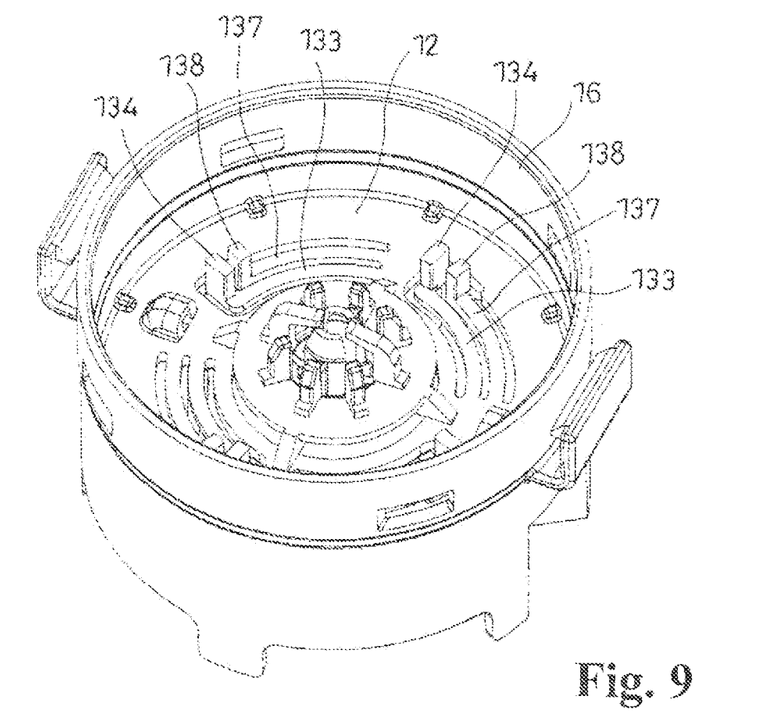
FIG. 9 is a perspective view showing a second modified example in which one portion of the structure of the lower body is modified.
Figure 10:
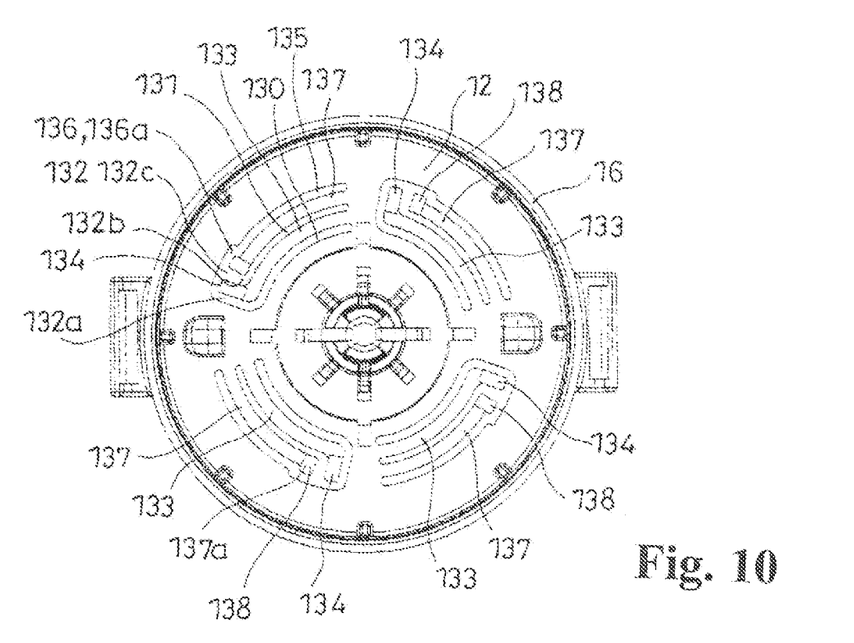
FIG. 10 is a plan view of the second modified example.

In an example shown in FIG. 9 and FIG. 10, there are further formed supplemental elastic pieces 137 outside the elastic pieces 133 shown in FIG. 1 to FIG. 7. In the example, by a third arc-shaped split groove 135 formed in such a way that the center of the face portion of the case 1 becomes the curvature inner side outside the second arc-shaped split groove 131; and a supplemental communication portion 136 communicating between one groove end of the second arc-shaped split groove 131 and one groove end of the third arc-shaped split groove 135, the supplemental elastic piece 137 in which a supplemental communication portion 136 side is a free end 137*a* is formed. Therewith, in the free end 137*a* of the supplemental elastic piece 137, there is protruded an abutment portion 138 relative to the bottom portion of the float body. In such a case, within a limited space, the elastic piece 133 and the supplemental elastic piece 137, abutting against the bottom portion of the upper float body 3 when the upper float body 3 descends, can be provided so as to be easily elastically deformable at the abutment time. In the illustrated example, the supplemental communication portion 136 is formed by a fourth split groove 136*a* communicating between one groove end of the third arc-shaped split groove 135 and a terminal of the third split groove 135*c*. The free end 137*a* of the supplemental elastic piece 137 is positioned on the other groove end side of the first arc-shaped split groove 130 more than the free end 133*a* of the elastic piece 133. Also, in the example, a protruding size of the abutment portion 138 of the supplemental elastic piece 137 is smaller than a protruding size of the abutment portion 134 of the elastic piece 133. Thereby, in the example, when the upper float body 3 descends, first, the elastic piece 133 abuts against the bottom portion of the upper float body 3 in the abutment portion 134, and next the elastic piece 133 bends due to the abutment, so that the abutment portion 138 of the supplemental elastic piece 133 abuts against the bottom portion of the upper float body 3 which further moves slightly downward.

Figure 11:
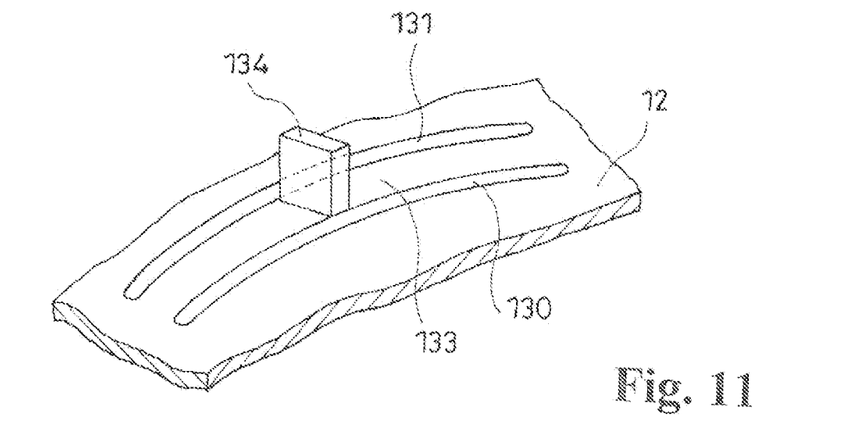
FIG. 11 is a perspective view of essential parts showing a third modified example in which one portion of the structure of the lower body is modified.

FIG. 11 shows a modified example in which the elastic piece 133 includes the abutment portion 134 protruding upward at a center of a curvature piece formed between the first and second arc-shaped split grooves 130 and 131, and the abutment portion 134 abuts against the bottom portion of the upper float body 3.

Figure 12:
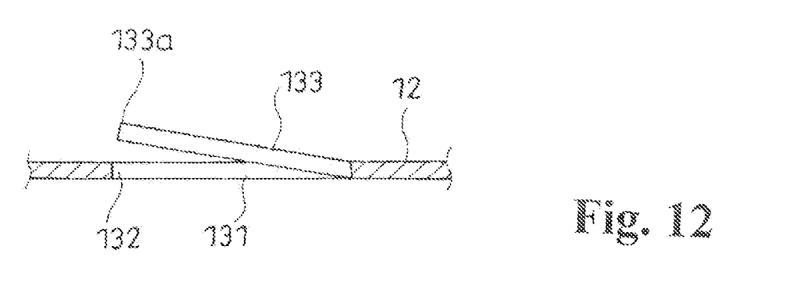
FIG. 12 is a perspective view of essential parts showing a fourth modified example in which one portion of the structure of the lower body is modified.

Also, FIG. 12 shows a modified example in which the elastic piece 133 is structured by a curvature piece formed by the first and second arc-shaped split grooves 130 and 131, and the communication portion 132 communicating between groove ends of the first and second arc-shaped split grooves 130 and 131. Also, the free end 133*a* of the curvature piece is positioned above the rest of the face portion, and the free end 133*a* abuts against the bottom portion of the upper float body 3.

Figure 13:
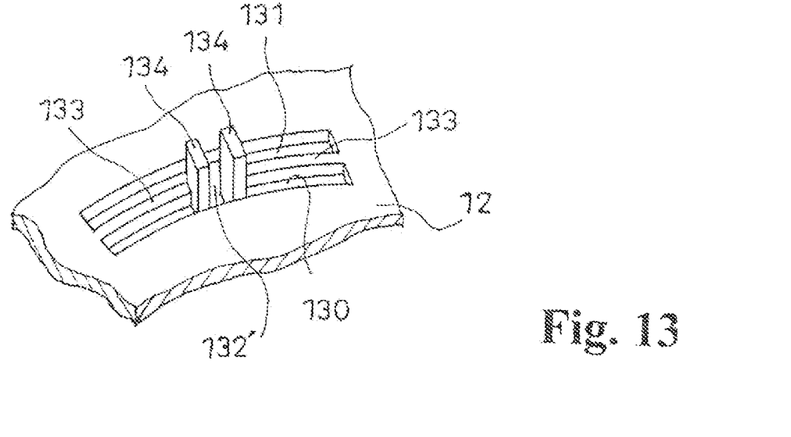
FIG. 13 is a perspective view of essential parts showing a fifth modified example in which one portion of the structure of the lower body is modified.

Also, FIG. 13 shows a modified example in which two curvature pieces are formed between the first and second arc-shaped spilt grooves 130 and 131 by a communication portion 132' communicating between an intermediate position of the first arc-shaped split groove 130 and an intermediate position of the second arc-shaped split groove 131, and by the two curvature pieces, two elastic pieces 133 and 133 are formed, whose free ends face each other through the communication portion 132' between the first and second arc-shaped split grooves 130 and 131. Each elastic piece 133 includes the abutment portion 134 protruding upward at the free end thereof, respectively, and the abutment portion 131 abuts against the bottom portion of the upper float body 3.

Incidentally, all contents of the specification, claims, drawings, and abstract of Japanese Patent Application No.

2012-065643 filed on Mar. 22, 2012 are cited in their entireties herein and are incorporated as a disclosure of the specification of the present invention.

What is claimed is:

1. A valve device for a fuel tank, adapted to be attached to a fuel tank, comprising:
   a case including a vent valve port communicating with an outside of the fuel tank at an upper portion, and including an inflow portion for a fuel below the vent valve port; and
   a float body which is located inside the case and rises by the fuel flowing into the case so as to be seated in the vent valve port,
   wherein in a face portion facing a bottom portion of the float body in the case, an elastic piece is formed by a first arc-shaped split groove formed such that a center of the face portion becomes a curvature inner side, and a second arc-shaped split groove formed outside the first arc-shaped split groove such that the center of the face portion becomes a curvature inner side,
   the elastic piece has an arc-shape in which the center of the face portion becomes a curvature inner side,
   one portion of the elastic piece abuts against the bottom portion of the float body,
   the elastic piece is disposed in the face portion between the first arc-shaped split groove and the second arc-shaped split groove,
   the first arc-shaped split groove, the second arc-shaped split groove, and the elastic piece have an arc-shape curving around a center axis of the case, and
   the face portion further comprises a communicating portion communicating the first and second arc-shaped split grooves, the communicating portion comprising a first groove extending radially outwardly from one groove end of the first arc-shaped split groove, and extending beyond the second arc-shaped split groove; a second groove extending radially outwardly from one groove end of the second arc-shaped split groove; and a third groove extending perpendicular to the first and second grooves to communicate the first and second grooves.

2. A valve device for a fuel tank according to claim 1, wherein in a direction around the center of the face portion of the case, two or more elastic pieces are provided at an interval between adjacent elastic pieces.

3. A valve device for a fuel tank according to claim 1, wherein the case has a cylindrical shape, and the elastic piece is formed along an arc of a virtual circle around a cylinder axis of the case.

4. A valve device for a fuel tank according to claim 1, wherein the elastic piece extends radially outwardly toward the third groove of the communicating portion, and
   the elastic piece includes a free end surrounded by the first, second, and third grooves, the free end having an abutment portion protruding toward the bottom portion of the floating body.

5. A valve device for a fuel tank according to claim 1, wherein
   the elastic piece includes a free end with an abutment portion protruding relative to the bottom portion of the float body.

6. A valve device for a fuel tank according to claim 5, wherein the communication portion is formed such that a width of the free end of the elastic piece is larger than that of a rest of the elastic piece.

7. A valve device for a fuel tank, adapted to be attached to a fuel tank, comprising:
   a case including a vent valve port communicating with an outside of the fuel tank at an upper portion, and including an inflow portion for a fuel below the vent valve port; and
   a float body which is located inside the case and rises by the fuel flowing into the case so as to be seated in the vent valve port,
   wherein in a face portion facing a bottom portion of the float body in the case, an elastic piece is formed by a first arc-shaped split groove formed such that a center of the face portion becomes a curvature inner side, a second arc-shaped split groove formed outside the first arc-shaped split groove such that the center of the face portion becomes a curvature inner side, and a communication portion communicating between groove ends of the first and second arc-shaped split grooves, and a communication portion side becomes a free end,
   one portion of the elastic piece abuts against the bottom portion of the float body,
   in the free end of the elastic piece, an abutment portion relative to the bottom portion of the float body is protruded,
   by a third arc-shaped split groove formed outside the second arc-shaped split groove such that the center of the face portion of the case becomes a curvature inner side; and a supplemental communication portion communicating between one groove end of the second arc-shaped split groove and one groove end of the third arc-shaped split groove, a supplemental elastic piece in which a communication portion side is a free end is formed, and
   in the free end of the supplemental elastic piece, an abutment portion relative to the bottom portion of the float body is protruded.

8. A valve device for a fuel tank, adapted to be attached to a fuel tank, comprising:
   a case including a vent valve port communicating with an outside of the fuel tank at an upper portion, and including an inflow portion for a fuel below the vent valve port; and
   a float body which is located inside the case and rises by the fuel flowing into the case so as to be seated in the vent valve port,
   wherein in a face portion facing a bottom portion of the float body in the case, an elastic piece is formed by a first arc-shaped split groove formed such that a center of the face portion becomes a curvature inner side, and a second arc-shaped split groove formed outside the first arc-shaped split groove such that the center of the face portion becomes a curvature inner side,
   the elastic piece has an arc-shape in which the center of the face portion becomes a curvature inner side,
   one portion of the elastic piece abuts against the bottom portion of the float body,
   the first arc-shaped split groove, the second arc-shaped split groove, and the elastic piece have an arc-shape curving around a center axis of the case,
   the face portion further comprises a communicating portion extending radially at intermediate positions of the first and second arc-shaped split grooves to communicate the first and second arc-shaped split grooves, and
   the elastic piece includes first and second elastic pieces wherein each of a free end of the first and second elastic pieces has an abutment portion.

9. A valve device for a fuel tank, adapted to be attached to a fuel tank, comprising:

a case including a vent valve port communicating with an outside of the fuel tank at an upper portion, and including an inflow portion for a fuel below the vent valve port; and a float body which is located inside the case and rises by the fuel flowing into the case so as to be seated in the vent valve port, wherein in a face portion facing a bottom portion of the float body in the case, an elastic piece is formed by a first arc-shaped split groove formed such that a center of the face portion becomes a curvature inner side, and a second arc-shaped split groove formed outside the first arc-shaped split groove such that the center of the face portion becomes a curvature inner side, the elastic piece has an arc-shape in which the center of the face portion becomes a curvature inner side, one portion of the elastic piece abuts against the bottom portion of the float body, the elastic piece is disposed in the face portion between the first arc-shaped split groove and the second arc-shaped split groove, the first arc-shaped split groove, the second arc-shaped split groove, and the elastic piece have an arc-shape curving around a center axis of the case, and the face portion further comprises a communicating portion communicating the first and second arc-shaped split grooves, the communicating portion comprising a first groove extending radially inwardly from one groove end of the first arc-shaped split groove; a second groove extending radially inwardly from one groove end of the second arc-shaped split groove and extending beyond the first arc-shaped split groove; and a third groove extending perpendicular to the first and second grooves to communicate the first and second grooves.

* * * * *